United States Patent
Simpson et al.

(10) Patent No.: US 9,074,693 B2
(45) Date of Patent: Jul. 7, 2015

(54) ACTUATOR MOUNTING SYSTEM AND METHOD OF MOUNTING

(71) Applicant: General Electric Company, Schenectady, NY (US)

(72) Inventors: Andrew David Simpson, Burlington, KY (US); Michael Edward Sandy, West Chester, OH (US)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 13/691,223

(22) Filed: Nov. 30, 2012

(65) Prior Publication Data

US 2013/0284276 A1    Oct. 31, 2013

Related U.S. Application Data

(60) Provisional application No. 61/639,578, filed on Apr. 27, 2012.

(51) Int. Cl.
| | |
|---|---|
| *F16K 13/00* | (2006.01) |
| *F02C 6/08* | (2006.01) |
| *F16K 1/22* | (2006.01) |
| *F16K 27/02* | (2006.01) |
| *F01D 11/24* | (2006.01) |
| *F02C 7/047* | (2006.01) |

(52) U.S. Cl.
CPC ............... *F16K 13/00* (2013.01); *F01D 11/24* (2013.01); *F02C 6/08* (2013.01); *F02C 7/047* (2013.01); *F16K 1/221* (2013.01); *F16K 27/0218* (2013.01); *F16K 27/0281* (2013.01)

(58) Field of Classification Search
CPC ..... F16K 5/0647; F16K 31/041; F16K 13/00; F16K 1/221; F16K 27/0218; F16K 27/0281; B22D 41/18; F02C 6/08; F02C 7/047; F01D 11/24
USPC ................ 251/291–292; 137/315.17, 315.18, 137/315.22
See application file for complete search history.

(56) References Cited

U.S. PATENT DOCUMENTS

| | | | | |
|---|---|---|---|---|
| 4,135,838 | A * | 1/1979 | Vandenberg | ................... 403/316 |
| 4,177,713 | A | 12/1979 | Lewis et al. | |
| 4,887,634 | A * | 12/1989 | Killian | .................... 137/315.35 |
| 5,190,503 | A | 3/1993 | Russ | |
| 5,240,030 | A * | 8/1993 | Wang | ............................ 137/269 |
| 5,927,682 | A * | 7/1999 | Gul et al. | ........................ 251/77 |
| 5,954,088 | A * | 9/1999 | Huang | ..................... 137/315.21 |
| 6,446,935 | B1 * | 9/2002 | Winkler | ..................... 251/315.1 |
| 6,748,967 | B1 | 6/2004 | Smiltneek | |

(Continued)

FOREIGN PATENT DOCUMENTS

CH    193710 A    10/1937

OTHER PUBLICATIONS

Search Report and Written Opinion from PCT/US13/33987 dated Jul. 29, 2013.

*Primary Examiner* — Marina Tietjen
(74) *Attorney, Agent, or Firm* — General Electric Company; Pamela A. Kachur (57) ABSTRACT

An actuator mounting system is provided. The actuator mounting system includes a flow body and an actuator configured to be coupled to the flow body. The flow body includes a plurality of mounting points and the actuator is configured to be coupled to the flow body in a plurality of predetermined positions via the plurality of mounting points.

12 Claims, 10 Drawing Sheets

(56) References Cited

U.S. PATENT DOCUMENTS

| | | |
|---|---|---|
| 6,769,868 B2 | 8/2004 | Harrold |
| 8,196,895 B2 | 6/2012 | Baumbach et al. |
| 2003/0034474 A1 | 2/2003 | Proctor et al. |
| 2003/0127619 A1 | 7/2003 | Wang |
| 2007/0176068 A1 | 8/2007 | Kuo-Chen |
| 2008/0078972 A1 | 4/2008 | Palin et al. |
| 2011/0240893 A1* | 10/2011 | Windgassen ............ 251/129.13 |
| 2012/0199776 A1* | 8/2012 | Kreuter ..................... 251/292 |

* cited by examiner

ACTUATOR MOUNTING SYSTEM AND METHOD OF MOUNTING

CROSS REFERENCE TO RELATED APPLICATIONS

This application claims priority to U.S. Provisional Application No. 61/639,578 filed Apr. 27, 2012, which is hereby incorporated by reference in its entirety.

BACKGROUND OF THE INVENTION

The field of the invention relates generally to aircraft systems and, more particularly to methods and systems for mounting an actuator to a flow body.

At least some known gas turbine engines include an engine casing that extends circumferentially around a compressor, and a turbine that each include a rotor assembly and a stator assembly. Known rotor assemblies include at least one row of rotating blades that extend radially outward from a blade root to a blade tip. A radial tip clearance is defined between the rotating blade tips and a stationary shroud attached to the engine casing.

In these known assemblies, during engine operation, the thermal environment variations in the engine may cause thermal expansion or contraction of the rotor and stator assemblies. Such thermal expansion or contraction may not occur uniformly in magnitude or rate. As a result, inadvertent rubbing, such as between the rotor blade tips and the shroud may occur. Moreover, radial clearances may be created that are wider than the design clearances. These wider clearances may adversely affect engine performance. Continued rubbing between the rotor blade tips and engine casing may lead to premature failure of the rotor blade.

In at least some other known assemblies, the formation of ice on aircraft wings, propellers, air inlets of engines, etc. is a problem that must that must be compensated for. In the case of jet-propelled aircraft, large pieces of ice breaking loose from the leading edge of an engine inlet housing can damage rotating turbine blades or other internal engine components.

At least some known aircraft assemblies use ring systems for clearance control, anti-icing, and compartment cooling purposes, for example. In these known assemblies, fluid flows through the series of pipes coupled to the turbine engine during certain operating conditions. Furthermore, a valve system including a series of flow bodies and rotary actuators control the flow of fluid through the pipes. However, generally, flow bodies and actuators in these known assemblies are designed for use with only a specific part of an engine.

BRIEF DESCRIPTION OF THE INVENTION

In one aspect, an actuator mounting system is provided. The actuator mounting system includes a flow body and an actuator configured to be coupled to the flow body. The flow body includes a plurality of mounting points and the actuator is configured to be coupled to the flow body in a plurality of predetermined positions via the plurality of mounting points.

In another aspect, a method of mounting an actuator to a flow body is provided. The flow body includes a plurality of mounting points. The method includes configuring the actuator to be couplable to the flow body in a plurality of predetermined positions coupling the actuator to the flow body in one of the predetermined positions, wherein the actuator is coupled to the flow body via the plurality of mounting points.

In yet another aspect, a control valve system for use with a turbine engine is provided. The control valve system includes a first pipe section and a second pipe section, flow body coupled between the first pipe section and the second pipe section, and an actuator configured to be coupled to said flow body. The flow body includes a plurality of mounting points and the actuator is configured to be coupled to the flow body in a plurality of predetermined positions via the plurality of mounting points.

DETAILED DESCRIPTION OF THE INVENTION

Embodiments of the present invention are directed to aircraft assemblies and, more specifically, systems for mounting an actuator to a flow body. Even more specifically, embodiments of the present invention are directed to a flow body including a plurality of mounting points such that an actuator may be mounted on the flow body in desired positions. For example, the mounting points described herein facilitate mounting the actuator in different positions such that fuel lines and electrical lines are more easily connectable to the actuator.

As such, in the exemplary embodiments, the mounting points on the flow body and actuator are arranged to enable the actuator to be mounted in four distinct predetermined positions. More specifically, the flow body includes three mounting points and the actuator includes four mounting points. Furthermore, the flow body includes mounting feet that are arranged to enable access to a lockout feature. As such, the mounting arrangements described herein facilitate modifying an actuator and flow body for use in multiple parts of an engine. As such, the mounting arrangements facilitate gravity drain of an actuator connector, simplification of engine component parts, and decreasing the weight of the overall engine assembly.

Figure 1:
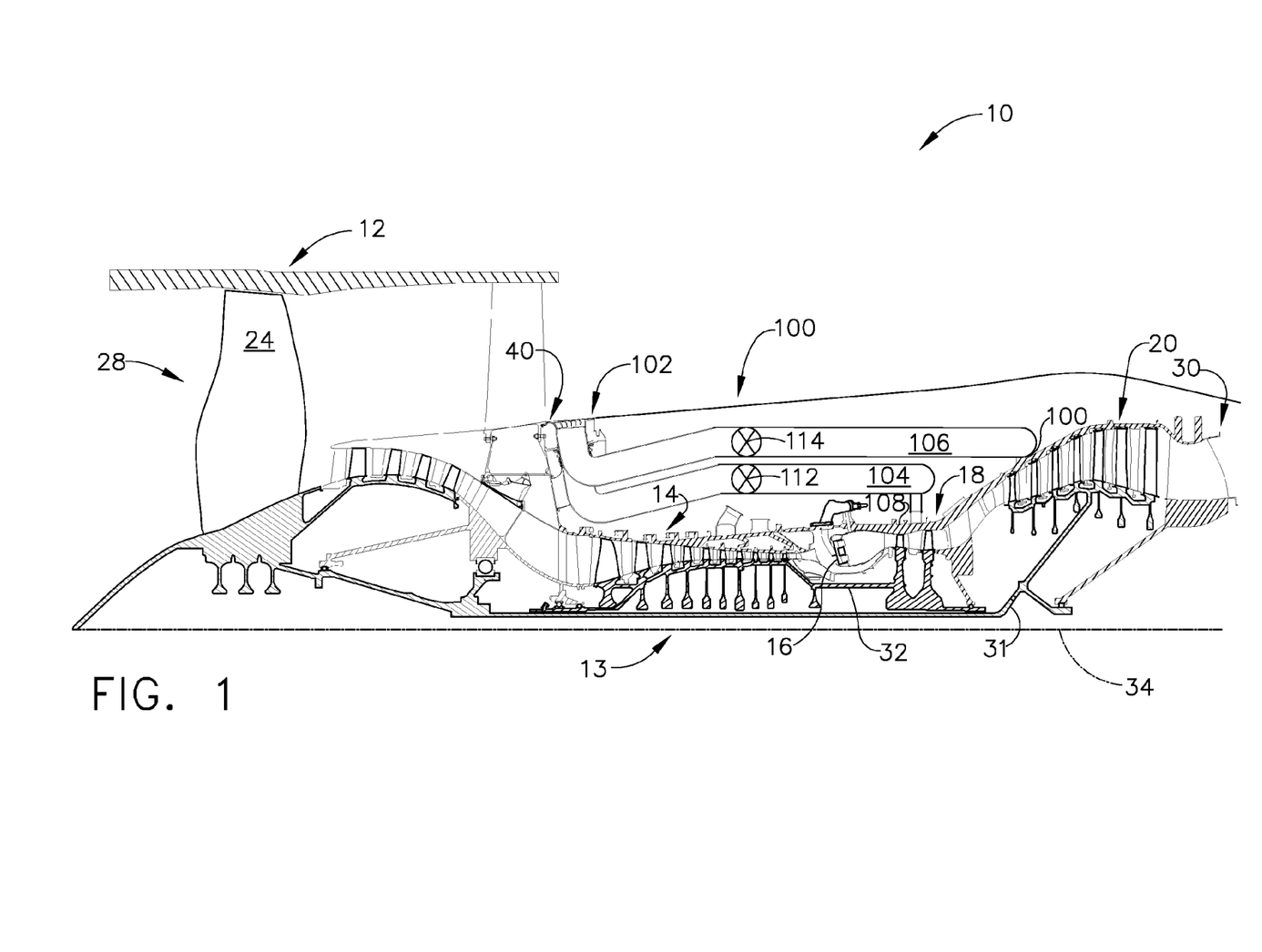
FIG. 1 is a schematic view of an exemplary gas turbine engine.

FIG. 1 is a schematic view of an exemplary gas turbine engine 10 that includes a fan assembly 12 and a core engine 13 including a high pressure compressor 14, a combustor 16, and a high pressure turbine 18. Engine 10 also includes a low pressure turbine 20. Fan assembly 12 includes an array of fan blades 24 that extend radially outward from a rotor disk 26. Engine 10 has an intake side 28 and an exhaust side 30. Fan assembly 12 and low pressure turbine 20 are coupled by a low speed rotor shaft 31, and compressor 14 and high pressure turbine 18 are coupled by a high speed rotor shaft 32.

Generally, during operation, air flows axially through fan assembly 12, in a direction that is substantially parallel to a central axis 34 extending through engine 10, and compressed air is supplied to high pressure compressor 14. The highly compressed air is delivered to combustor 16. Combustion gas flow (not shown) from combustor 16 drives turbines 18 and 20. Turbine 18 drives compressor 14 by way of shaft 32 and turbine 20 drives fan assembly 12 by way of shaft 31.

Gas turbine engine 10 also includes an active clearance control system 100. In the exemplary embodiment, clearance control system 100 is coupled to a fan frame hub 40 associated with fan blades 24, and clearance control system 100 includes an inlet assembly 102 and at least two active clearance control supply pipes 104 and 106. Specifically, in the exemplary embodiment, a first active clearance control supply pipe 104 and a second active clearance control supply pipe 106 extend downstream from inlet assembly 102 to channel airflow towards a portion of high pressure turbine 18 and low pressure turbine 20, respectively. Specifically, in the exemplary embodiment, first pipe 104 is coupled to high pressure turbine casing manifold 108, and second pipe 106 is coupled to low pressure turbine casing manifold 110. In the exemplary embodiment, first pipe 104 includes a first actuator assembly 112 and second pipe 106 includes a second actuator assembly 114. Actuator assemblies 112 and 114 each include a valve (not shown in FIG. 1) to modulate airflow during engine operation. Although the exemplary embodiment illustrates an actuator assembly 200 used in active clearance control system 100, it should be understood that actuator assembly 200 may apply to valves used in high pressure turbine active clearance control (HPTACC), low pressure turbine active clearance control (LPTACC), core compartment cooling (CCC), booster anti-ice (BAI), nacelle anti-ice (NAI), start bleed valve (SBV), transient bleed valve (TBV), and modulated turbine cooling (MTC) systems.

Figure 2:
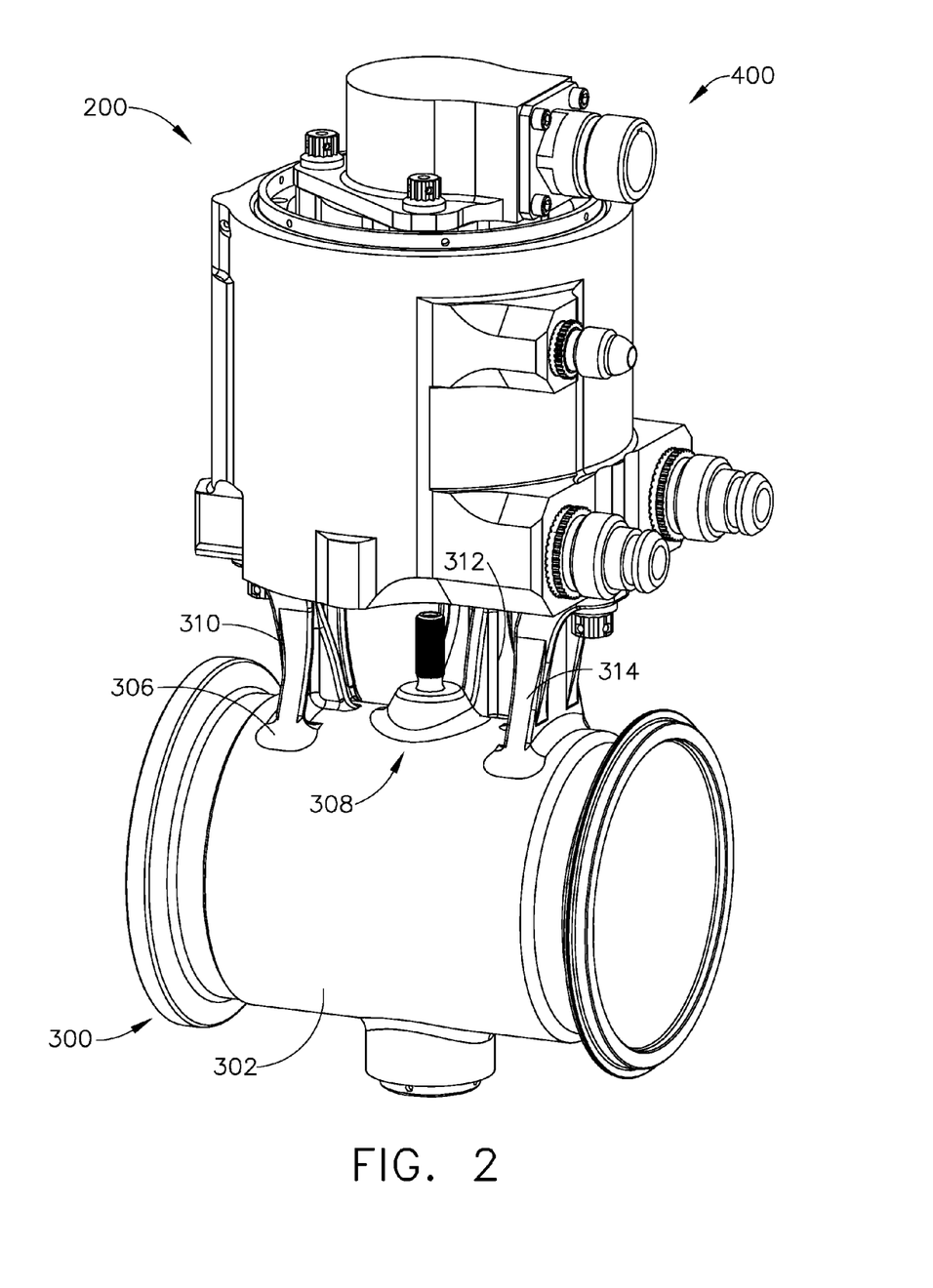
FIG. 2 is a perspective view of an exemplary actuator assembly.

FIG. 2 is a perspective view of an exemplary actuator assembly 200. In the exemplary embodiment, actuator assembly 200 includes a flow body 300 and a rotary actuator 400 mounted to flow body 300. Although actuator assembly 200 includes rotary actuator 400, it should be understood that the mounting system described herein may apply to any suitable actuator such as linear actuators and/or air actuators. Flow body 300 may include a butterfly plate (not shown) positioned therein. The butterfly plate is rotatable within flow body 300 and is actuated by rotary actuator 400. Furthermore, in the exemplary embodiment, the butterfly plate is sized to substantially conform to the shape of flow body 300 such that when the butterfly plate in a closed position, it facilitates substantially preventing the passage of fluid flowing therethrough.

Moreover, in the exemplary embodiment, flow body 300 includes a first foot 310, a second foot 312, and a third foot 314 that each extend from a flow body outer surface 306. Feet 310, 312, and 314 are integrally formed with and extend from flow body 300 to facilitate mounting rotary actuator 400 to flow body 300. Furthermore, in the exemplary embodiment, a gap 308 is positioned between foot 310 and foot 314 to facilitate access to a lockout feature (not shown). In alternative embodiments, flow body 300 may include any suitable number of feet for mounting rotary actuator 400 to flow body 300.

Figure 3:
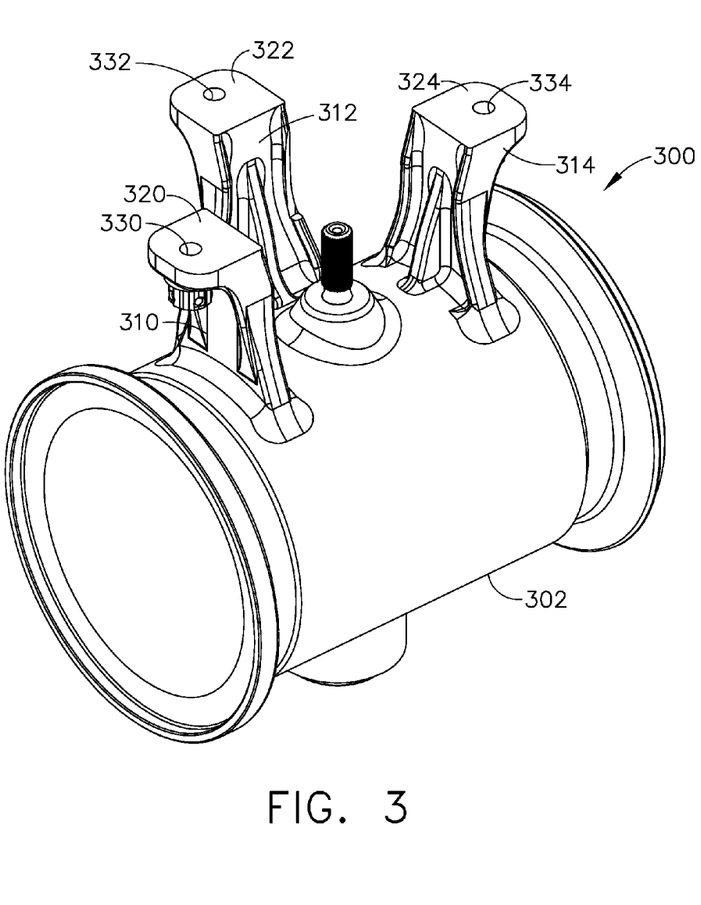
FIG. 3 is a perspective view of a flow body of the actuator assembly shown in FIG. 2.

FIG. 3 is a perspective view of flow body 300. In the exemplary embodiment, each foot includes a mounting pad formed thereon. For example, foot 310 includes a first mounting pad 320, foot 312 includes a second mounting pad 322, and foot 314 includes a third mounting pad 324. Furthermore, in the exemplary embodiment, mounting pad 320 includes a pad aperture 330, mounting pad 322 includes a mounting aperture 332, and mounting pad 324 includes a mounting aperture 334. Accordingly, in the exemplary embodiment, pad apertures 330, 332, and 334 are positioned about a central axis 340 of flow body 300. Each pad aperture 330, 332, and 334 is sized to receive a mounting bolt (not shown). Mounting pads 320, 322, and 324 extend substantially perpendicularly from their respective feet 310, 312, and 314. As such, mounting pads 320, 322, and 324 are substantially flush with respect to a mounting surface 404 (not shown in FIG. 3) of rotary actuator 400 when rotary actuator 400 is mounted to flow body 300.

Figure 4:
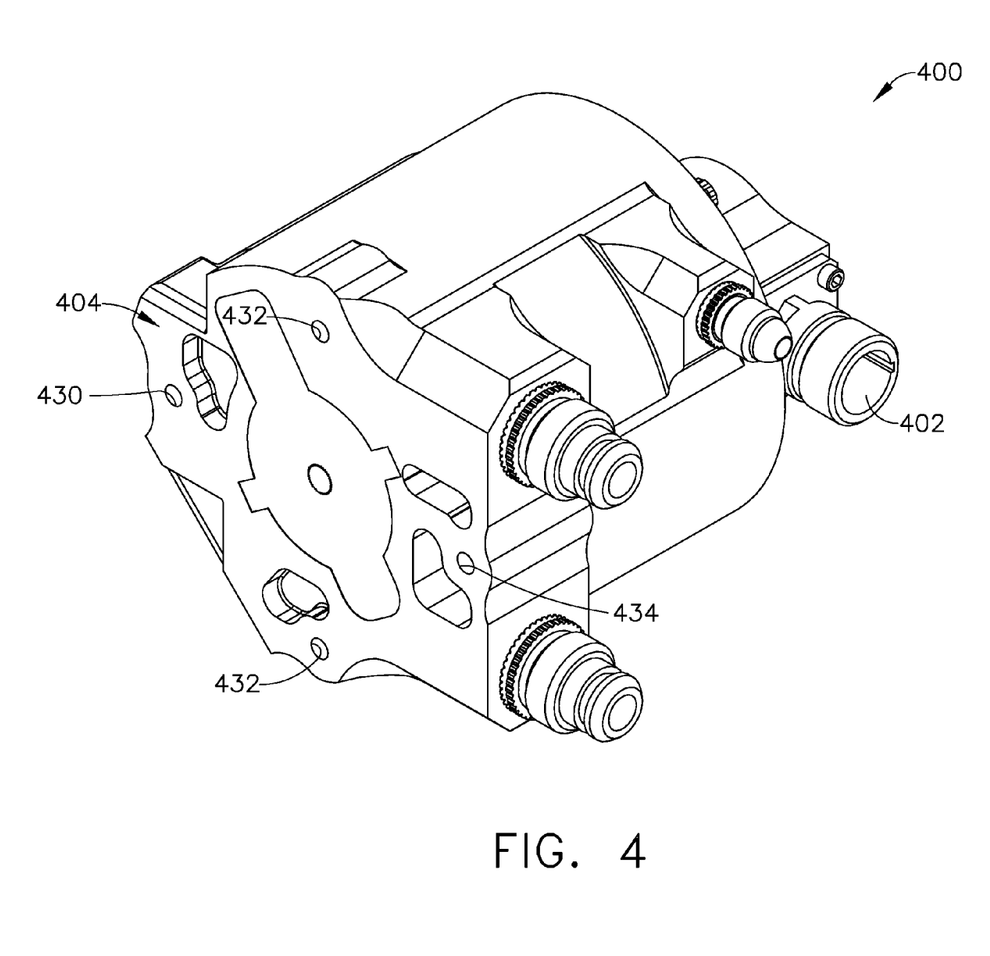
FIG. 4 is a perspective view of a rotary actuator of the actuator assembly shown in FIG. 2.

FIG. 4 is a perspective view of rotary actuator 400. In the exemplary embodiment, rotary actuator includes a connector 402 and a mounting surface 404. Mounting surface 404 includes a first mounting aperture 430, a second mounting aperture 432, a third mounting aperture 434, and a fourth mounting aperture 436. Furthermore, in the exemplary embodiment, mounting apertures 430, 432, 434, and 436 are sized to receive a mounting bolt (not shown). As such, mounting apertures 430, 432, 434, and 436 are substantially similarly sized with respect to pad apertures 330, 332, and 334.

Figure 5:
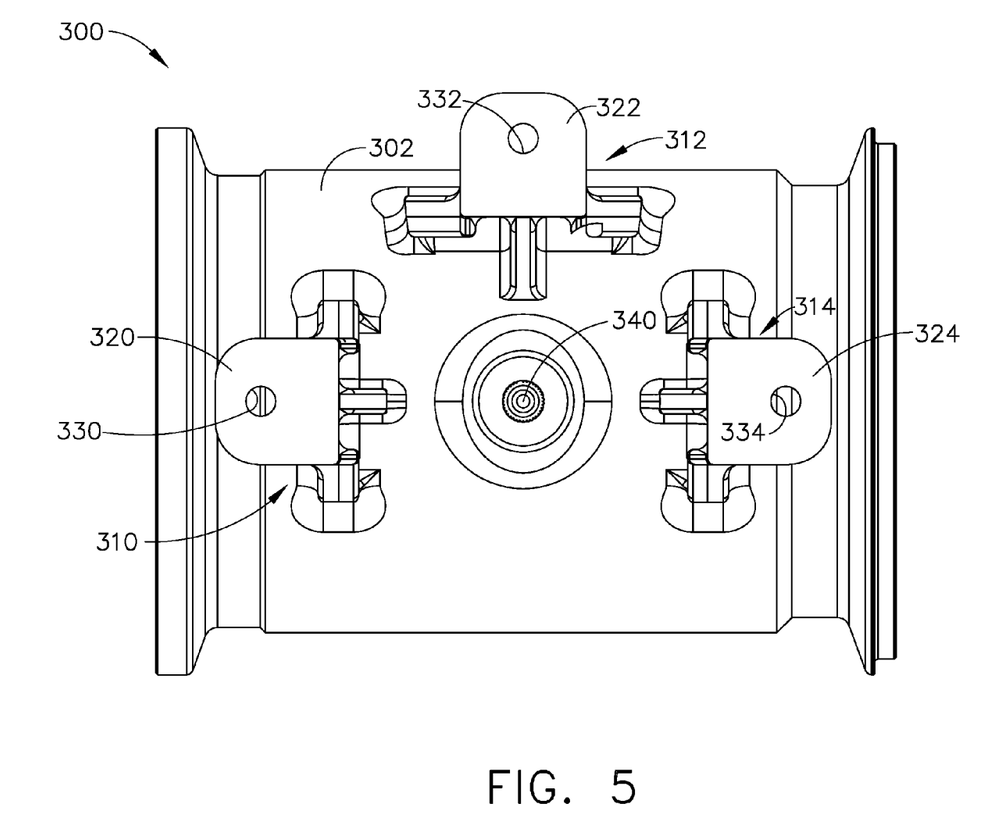
FIG. 5 is a top view of the flow body shown in FIG. 3.
Figure 6:
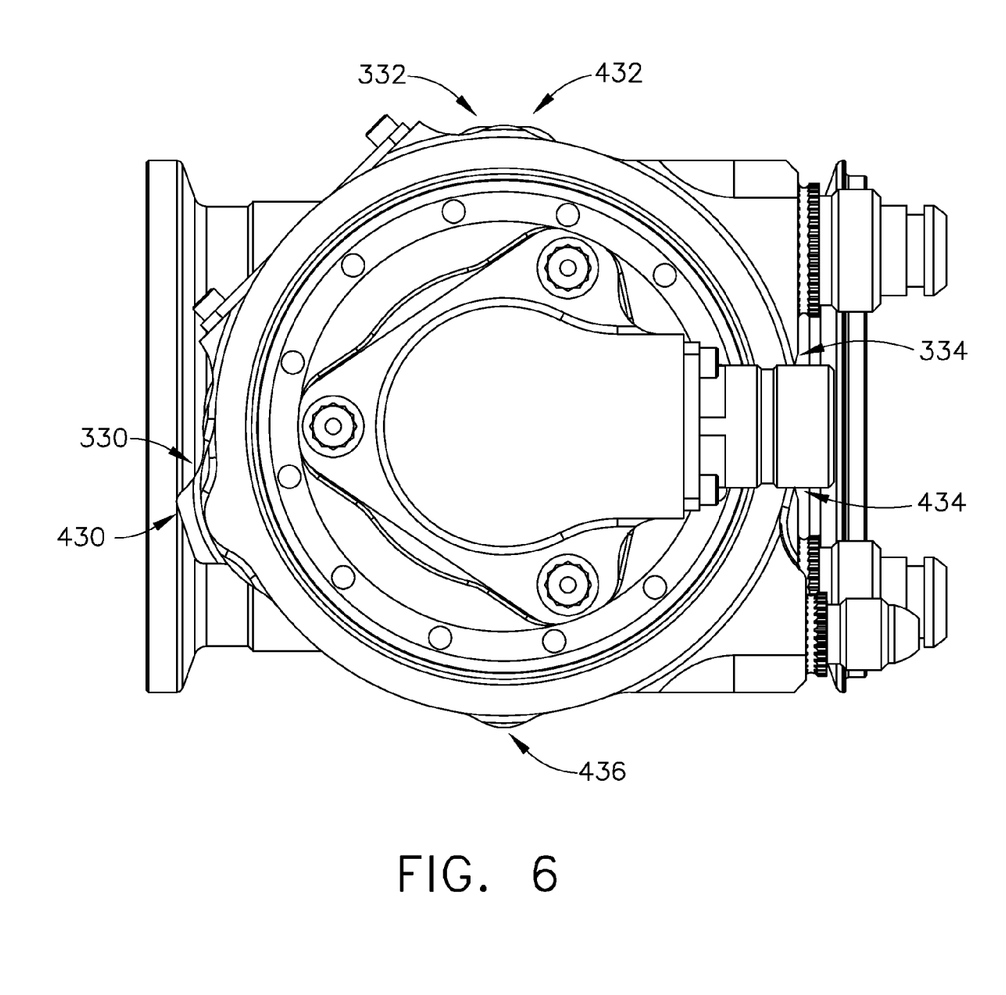
FIG. 6 is a top view of the actuator assembly shown in FIG. 2.

FIG. 5 is a top view of flow body 300, and FIG. 6 is a top view of rotary actuator 400 mounted to flow body 300. In the exemplary embodiments, feet 310, 312, and 314 are spaced from each other about central axis 340 of flow body 300. More specifically, in one embodiment, foot 310 is positioned at the 270° position, foot 312 is positioned at the 0° position, and foot 314 is positioned at the 90° position about central axis 340. However, it should be understood that the positioning of feet about central axis 340 is dependent upon the number of feet that extend from flow body 300. Furthermore, in the exemplary embodiment, mounting surface 404 is coupled to mounting pads 320, 322, and 324. Rotary actuator 400 is oriented upon mounting pads 320, 322, and 324 such that mounting apertures 430, 432, 434, and 436 align with pad apertures 330, 332, and 334. For example, in the exemplary embodiment, mounting aperture 430 aligns with pad aperture 330, mounting aperture 432 aligns with pad aperture 332, and mounting aperture 434 aligns with pad aperture 334. Mounting aperture 436 is used to receive a lockout feature or, in an alternative embodiment, may be blocked off completely. Moreover, in the exemplary embodiment, when mounting apertures 430, 432, 434, and 436 are aligned with pad apertures 330, 332, and 334, respectively, a mounting bolt is inserted therethrough to facilitate mounting rotary actuator 400 to flow body 300.

Figure 7:
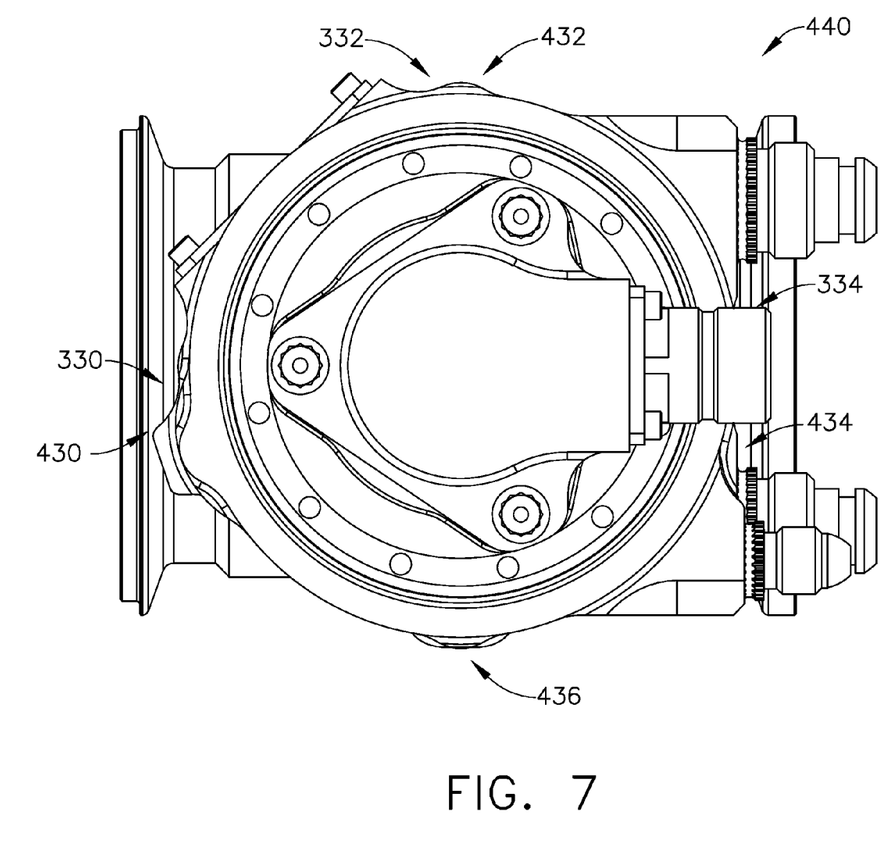
FIG. 7 is a top view of the actuator assembly shown in FIG. 6 with the rotary actuator in a first position.
Figure 8:
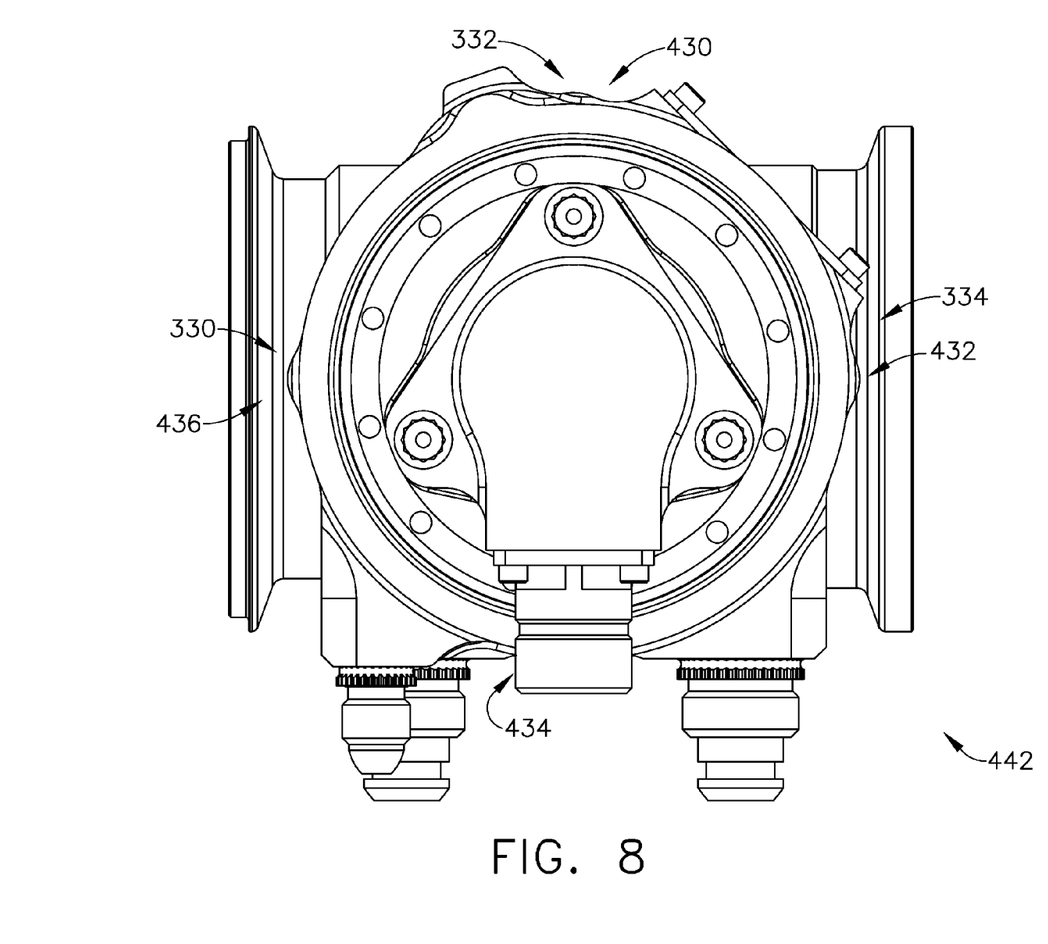
FIG. 8 is a top view of the actuator assembly shown in FIG. 6 with the rotary actuator in a second position.
Figure 9:
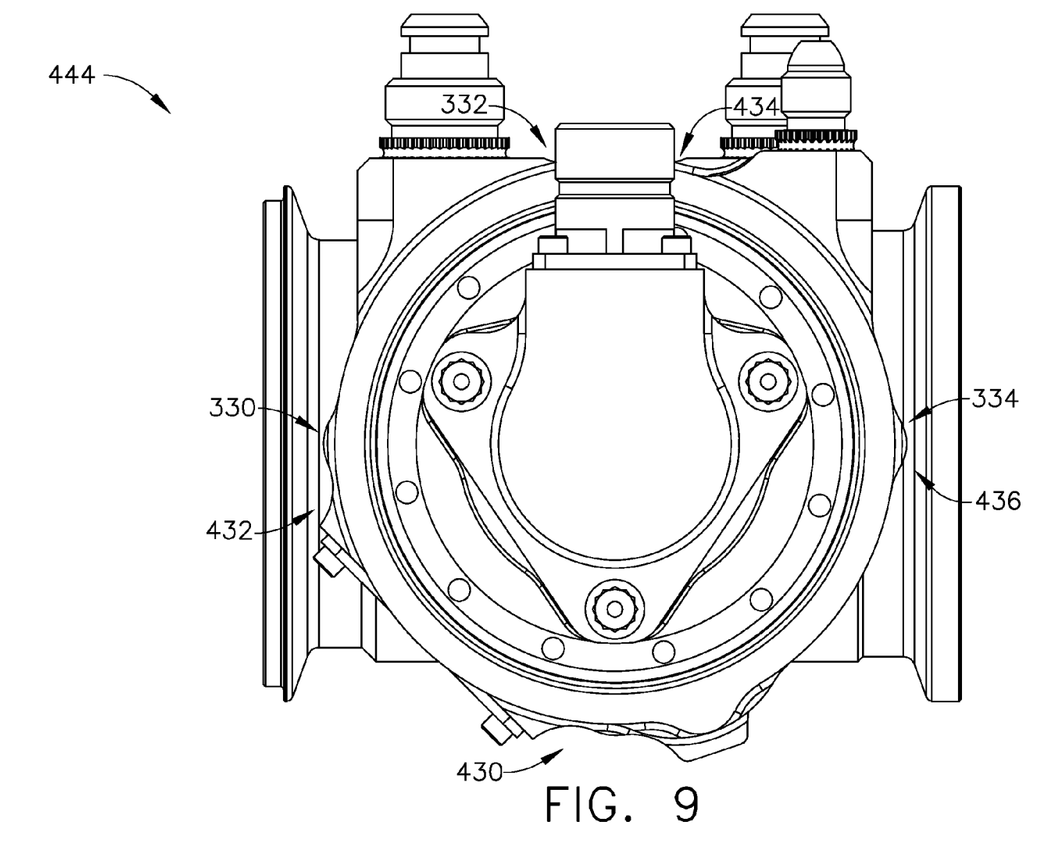
FIG. 9 is a top view of the actuator assembly shown in FIG. 6 with the rotary actuator in a third position.
Figure 10:
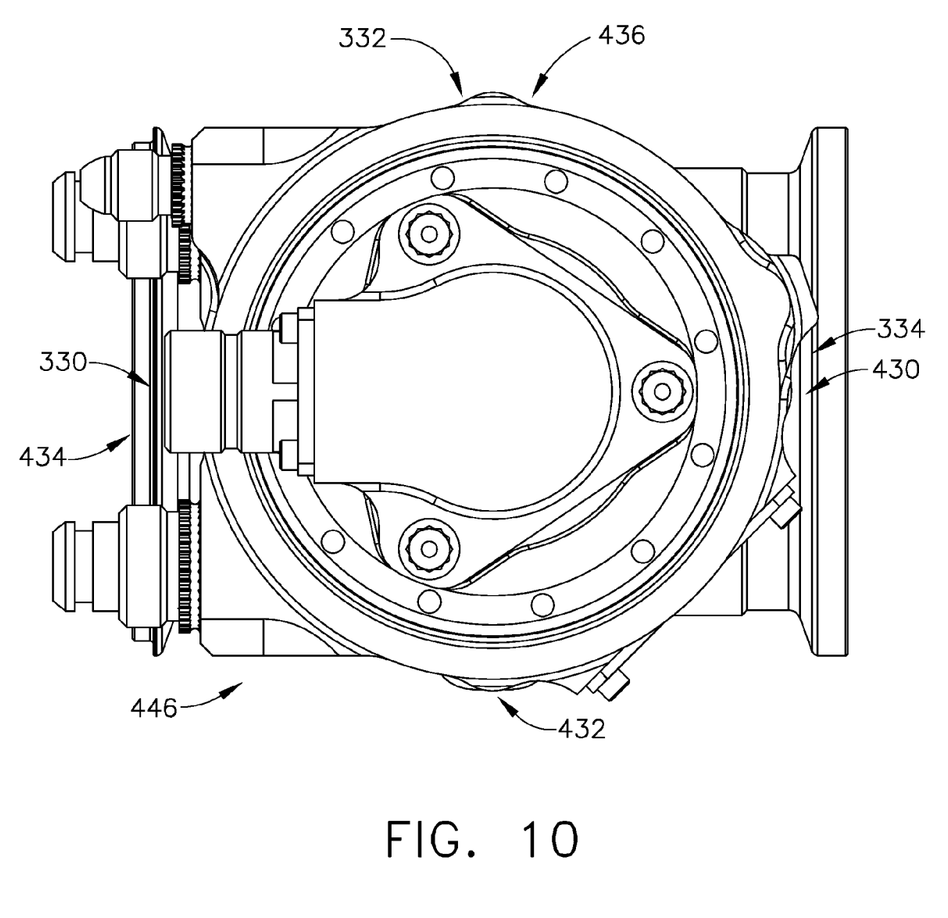
FIG. 10 is a top view of the actuator assembly shown in FIG. 6 with the rotary actuator in a fourth position.

FIGS. 7-10 are top views of exemplary mounting arrangements. Rotary actuator 400 is configured to be coupled to flow body 300 in a plurality of predetermined positions via pad apertures 330, 332, and 334. For example FIG. 7 is a view of rotary actuator 400 in a first position 440, FIG. 8 is a view of rotary actuator 400 in a second position 442, FIG. 9 is a view of rotary actuator 400 in a third position 444, and FIG. 10 is a view of rotary actuator 400 in a fourth position 446. Accordingly, rotary actuator 400 is rotated relative to central axis 340 (shown in FIG. 3) to move rotary actuator 400 into one of the predetermined positions 440, 442, 444, or 446.

In the exemplary embodiments, rotary actuator 400 in first position 440 includes aligning mounting aperture 430 with pad aperture 330, aligning mounting aperture 432 with pad aperture 332, aligning mounting aperture 434 with pad aperture 334, and using mounting aperture 436 to receive the lockout feature. Rotary actuator 400 in second position 442 includes aligning mounting aperture 436 with pad aperture 330, aligning mounting aperture 430 with pad aperture 332, aligning mounting aperture 432 with pad aperture 334, and using mounting aperture 434 to receive the lockout feature. Rotary actuator 400 in third position 444 includes aligning mounting aperture 432 with pad aperture 330, aligning mounting aperture 434 with pad aperture 332, aligning mounting aperture 436 with pad aperture 334, and using mounting aperture 430 to receive the lockout feature. Rotary actuator 400 in fourth position 446 includes aligning mounting aperture 434 with pad aperture 330, aligning mounting aperture 436 with pad aperture 332, aligning mounting aperture 430 with pad aperture 334, and using mounting aperture 432 to receive the lockout feature.

In the exemplary embodiment, a lockout feature is accessible through gap 308 (shown in FIG. 2) between foot 310 and foot 314. For example, the lockout feature facilitates manually overriding and locking the butterfly plate in a set position. As such, in the exemplary embodiment, one of mounting apertures 430, 432, 434, and 436 that is not coupled to one of mounting pads 320, 322, and 324 receive the lockout feature. In alternative embodiments, one of mounting apertures 430, 432, 434, and 436 may be blocked off completely when not used to receive a lockout feature.

The mounting system described herein facilitates enabling an actuator to be mounted in predetermined positions upon a flow body. More specifically, the mounting feet of the flow body and the mounting apertures of the actuator are arranged such that the actuator assembly may adapt to being positioned at various locations on a turbine engine. For example, service lines such as electrical and fuel lines are connected to the actuator assembly. The service connections on the actuator are generally in a predetermined position. The actuator assembly described herein is adjustable to position the service connections to receive the service lines without further adjustment of the service lines. As such, overall weight of the turbine assembly is reduced and engine component parts are simplified.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An actuator mounting system comprising:
   a flow body comprising a plurality of feet integrally formed with and extending outwardly from a surface of said flow body, wherein each foot comprises a mounting pad including a mounting point, and wherein a thickness of said mounting pad extends substantially perpendicularly with respect to said plurality of feet; and
   an actuator comprising a mounting surface and a plurality of mounting apertures defined therein configured to be coupled to said flow body in a plurality of predetermined positions via said plurality of mounting points; wherein at least one of said plurality of mounting apertures is not aligned with one of said plurality of mounting points, wherein the mounting aperture that is not aligned with one of said plurality of mounting points is configured to receive a lockout feature.

2. The mounting system in accordance with claim 1, wherein said plurality of feet extend from an outer surface of said flow body in a pattern that is substantially coaxially with respect to a central axis of said flow body.

3. The mounting system in accordance with claim 1, wherein said plurality of feet are spaced from each other about a central axis of said flow body.

4. The mounting system in accordance with claim 1, wherein said plurality of mounting points comprise a pad aperture defined within each mounting pad.

5. The mounting system in accordance with claim 1, wherein said actuator is configured to be coupled to said flow body in four predetermined positions.

6. A method of mounting an actuator to a flow body that includes a plurality of feet wherein each foot comprises a pad including a mounting point, and wherein a thickness of said mounting pad extends substantially perpendicularly with respect to said plurality of feet said method comprising:
   configuring the actuator comprising a mounting surface and a plurality of mounting apertures defined therein to be couplable to the flow body in a plurality of predetermined positions; and
   coupling the actuator to the flow body in one of the predetermined positions, wherein the actuator is coupled to the flow body via the plurality of mounting points integrally formed with and extending outwardly from a surface of said flow body; and wherein at least one of said plurality of mounting apertures is not aligned with one of said plurality of mounting points, wherein the mounting aperture that is not aligned with one of said plurality of mounting points is configured to receive a lockout feature.

7. The method in accordance with claim 6 further comprising positioning the plurality of mounting points about a central axis of the flow body.

8. The method in accordance with claim 6 further comprising:
   uncoupling the actuator from the flow body; and
   moving the actuator into another of the plurality of predetermined positions.

9. The method in accordance with claim 8, wherein moving the actuator further comprises rotating the actuator relative to a central axis of the flow body such that the actuator is selectively moved into another of the plurality of predetermined positions.

10. The method in accordance with claim 6 wherein configuring the actuator further comprises:
    defining a plurality of mounting apertures within a mounting surface of the actuator; and
    aligning the plurality of apertures with the plurality of mounting points when the actuator is in one of the predetermined positions.

11. A control valve system for use with a turbine engine, the control valve system including a first pipe section and a second pipe section, the control valve system comprising:
    a flow body coupled between the first pipe section and the second pipe section, wherein said flow body comprises a plurality of feet integrally formed with and extending outwardly from a surface of said flow body; wherein each foot comprises a mounting pad including a mounting point, and wherein a thickness of said mounting pad extends substantially perpendicularly with respect to said plurality of feet; and;
    an actuator comprising a mounting surface and a plurality of mounting apertures defined therein configured to be coupled to said flow body in a plurality of predetermined positions via said plurality of mounting points; wherein at least one of said plurality of mounting apertures is not aligned with one of said plurality of mounting points, wherein the mounting aperture that is not aligned with one of said plurality of mounting points is configured to receive a lockout feature.

12. The control valve system in accordance with claim 11, wherein said plurality of mounting points comprise a pad aperture defined within each mounting pad.

* * * * *